United States Patent [19]
Nattel et al.

[11] Patent Number: 5,594,209
[45] Date of Patent: Jan. 14, 1997

[54] CABLE CONNECTOR CLAMP

[75] Inventors: William Nattel, Montreal, Canada; Alain Michaud, Quebec City, both of Canada

[73] Assignee: Thomas & Betts Corporation, Memphis, Tenn.

[21] Appl. No.: 227,746

[22] Filed: Apr. 13, 1994

[30] Foreign Application Priority Data

Apr. 23, 1993 [CA] Canada ................... 2094789

[51] Int. Cl.$^6$ ........................................... H02G 3/22
[52] U.S. Cl. ........................ 174/65 G; 174/153 G; 248/56; 285/162
[58] Field of Search ................ 174/153 G, 152 G, 174/166 R, 65 G, 65 R, 64, 135, 40 CC; 248/56; 439/449, 461, 470; 24/115 G, 115 M, 324; 411/525, 526, 527; 16/2; 285/194

[56] References Cited

U.S. PATENT DOCUMENTS

| 2,457,235 | 12/1948 | Hoehn ............... 174/65 R X |
| 2,458,409 | 1/1949 | Paige . | |
| 3,288,407 | 11/1966 | Downer et al. . | |
| 3,366,356 | 1/1968 | Fisher ................ 248/56 |
| 3,562,847 | 2/1971 | Jemison . | |
| 4,970,350 | 11/1990 | Harrington ............ 174/65 G |

FOREIGN PATENT DOCUMENTS

| 833156 | 1/1970 | Canada . |
| 1295383 | 2/1992 | Canada . |

Primary Examiner—Hyung S. Sough
Assistant Examiner—Paramita Ghosh
Attorney, Agent, or Firm—Michael L. Hoelter; Salvatore J. Abbruzzese

[57] ABSTRACT

A cable connector clamp for an insulated electrical cable is preferably integrally moulded from a resilient plastic material. It has a cylindrical housing defining a passage for the cable, and a slot to permit its insertion into a knock out or opening of an enclosure wall. Within the housing, there is a clamping element extending across the passage and resiliently deflectable, to permit insertion of a cable. The clamping element includes a clamping lip that is resiliently pressed against the cable to prevent its withdrawal from the connective clamp. To assist in clamping the cable, one or both of a clamping lip of reduced thickness at the free end of the clamping element, and additional projections on the inner wall of the housing are provided. The additional projections have abutment faces, perpendicular to the axis of the housing and facing the second end of it.

23 Claims, 4 Drawing Sheets

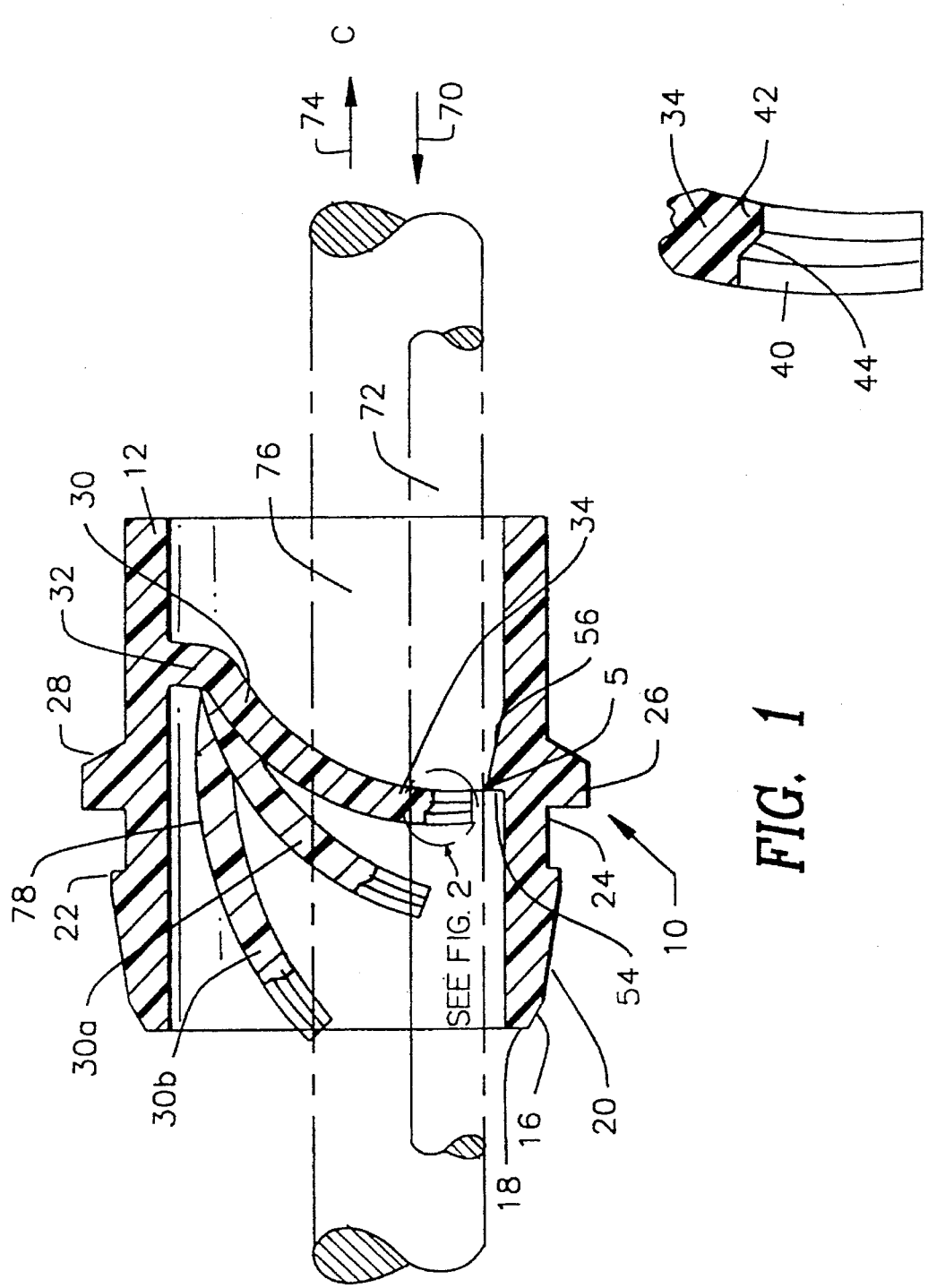

CABLE CONNECTOR CLAMP

FIELD OF THE INVENTION

This invention relates to an electrical connector clamp, and more particularly, relates to such an electrical connector clamp including a self-locking mechanism, for securing electrical non-metallic covered cables to wiring enclosures.

BACKGROUND OF THE INVENTION

Electrical cables are used to connect together a variety of pieces of electrical equipment. In both domestic and industrial usage, it is common for fixed wiring cables to be inserted through an opening or hole in the wall of an enclosure, in which the cable terminates and is connected to electrical devices contained within the enclosure. Commonly, the enclosure can comprise an outlet box, in which an electrical receptacle, switch, etc., is mounted. It is desirable that the cable be clamped to prevent any mechanical loads being applied to the actual electrical connections and the opening should be substantially closed.

Electrical codes commonly require the cable to be clamped and the opening at least partially closed after insertion of the cable. At least for outlet boxes, and for a number of other enclosures, it is common to provide a number of knockouts, i.e. disc-shaped portions of the enclosure or housing, which are partially precut, to enable easy removal to form an opening. This provides a great degree of flexibility, since an end user can form the number of openings required, in the sides of the enclosure that are most advantageous.

Once the opening has been formed, it is then necessary to provide some sort of a clamp. Such a clamp can be a separate element that is secured to the housing, as by having two elements that are screwed together, in the wall of the housing. This is relatively inconvenient and time consuming.

More recently, single unit, plastic strain relief cable connector clamps, including a self-locking mechanism have become widely used. These have the advantage that they are relatively cheap and simple to make, since they are formed as a single unit component, moulded in plastic. Installation is also relatively quick and simple. The cable clamp is essentially tubular with a slit along one side, to enable it to be squeezed, for insertion into the knockout or opening of an enclosure. It then resiliently returns to its original shape, and is provided with protruding ribs to lock it in the opening.

Within the cable connector, there is a clamping element, which simply resiliently deflects as a cable is inserted. Its free end is resiliently biased against the cable sheath, with the intention that it will engage the cable, to prevent the cable being withdrawn. Thus, no separate clamping action is required.

However, in order to accommodate a wide variety of different cable sizes, it is desirable for the clamp to have a larger clamping range. Such a known design, because of its geometry, provides a substantially higher initial clamping pressure or load for a small cable, as opposed to a large cable. For a large cable, the clamping element is at a poor angle to provide a significant clamping force.

An additional problem is that electrical codes commonly stipulate that openings in connectors should be practically closed after the cable has been inserted. In this known design, the clamping element is largely circular. For larger cables, when the clamping element is deflected, it interferes with the sides of the connector clamp, which in turn interferes with insertion of the cable and the clamping action.

SUMMARY OF THE PRESENT INVENTION

It is therefore desirable to provide a unitary one-piece cable connector clamp, which will provide adequate clamping for cables of a wide variety of different sizes. Further, it is desirable that such a connector clamp should meet the Electrical Code requirements of practically closing off the connector, while enabling any clamping element to freely deflect between a variety of different positions, to accommodate different cable sizes.

In accordance with one aspect of the present invention, there is provided a cable connector clamp comprising a housing having first and second ends and an inner wall defining a passage between the first and second ends, for an insulated electrical cable;

means on the housing for engaging an opening in an enclosure wall;

a clamping element extending from one side of the inner wall across the passage and inclined towards the second end, the clamping element including a free end portion and being resiliently deflectable to permit insertion of an electrical cable through the passage from the first end, the free end portion being resiliently biased against the cable to secure the cable from withdrawal through the first end, wherein the free end portion includes a clamping lip of reduced thickness relative to the remainder of the clamping element.

In accordance with another aspect of the present invention, there is provided a cable connector clamp comprising a housing having first and second ends and an inner wall defining a passage between the first and second ends, for an insulated electrical cable;

means on the housing for engaging an opening in an enclosure wall;

a clamping element extending from one side of the inner wall across the passage and inclined towards the second end, the clamping element including a free end portion and being resiliently deflectable to permit insertion of an electrical cable through the passage from the first end, the free end portion being resiliently biased against the cable to secure the cable from withdrawal through the first end; and at least one additional projection on the inner wall of the housing adjacent the clamping element and space therefrom, to assist in clamping a cable.

Preferably, the connector clamp is integrally moulded from a suitable plastic material. To accommodate cables of different sizes, the invention provides one or both of additional internal projections, and a clamping lip of specific configuration.

Projections can comprise one or both of: an additional projection opposite the clamping element itself; and side projections on either side of the clamping element. In all cases, the clamping element is provided with adequate clearance from the projections, while still ensuring that the housing is effectively closed after insertion of a cable. Particularly for an additional projection, opposite the clamping element, tension on the cable tending to withdraw it, causes the cable to be clamped or wedged between the free end of the clamping element and the additional projection, which ensures that the cable is securely held.

The free end of the clamping element is provided with a lip or flange configured to securely engage a cable sheath. This lip or flange preferably tapers in thickness towards an end surface that, in section, is straight. Viewed along the axis of the housing, the lip or flange is preferably concave and circular, to assist in engaging a cable sheath.

Each of the projections, in section, is preferably triangular, showing an inclined face extending from the first end of the housing, and a vertical abutment face, generally perpendicular to the axis of the housing and facing the second end. The projections would have a certain degree of resiliency, imparted by the nature of the material of the clamp.

BRIEF DESCRIPTION OF THE DRAWING FIGURES

For a better understanding of the present invention, and to show more clearly how it may be carried into effect, reference will now be made, by way of example, to the accompanying drawings, which show preferred embodiments of the present invention, and in which:

FIG. 1 is a sectional view through a cable connector clamp according to the present invention, along line AA of FIG. 3;

FIG. 2 is an expanded view of the clamping edge of a clamping element of the connector clamp of FIG. 1;

DESCRIPTION OF THE PREFERRED EMBODIMENTS

Referring to FIG. 1, a cable connector clamp in accordance with the present invention is generally indicated by the reference 10. The connector clamp 10 is integrally moulded from a suitable plastic material, in known manner.

Figure 3:
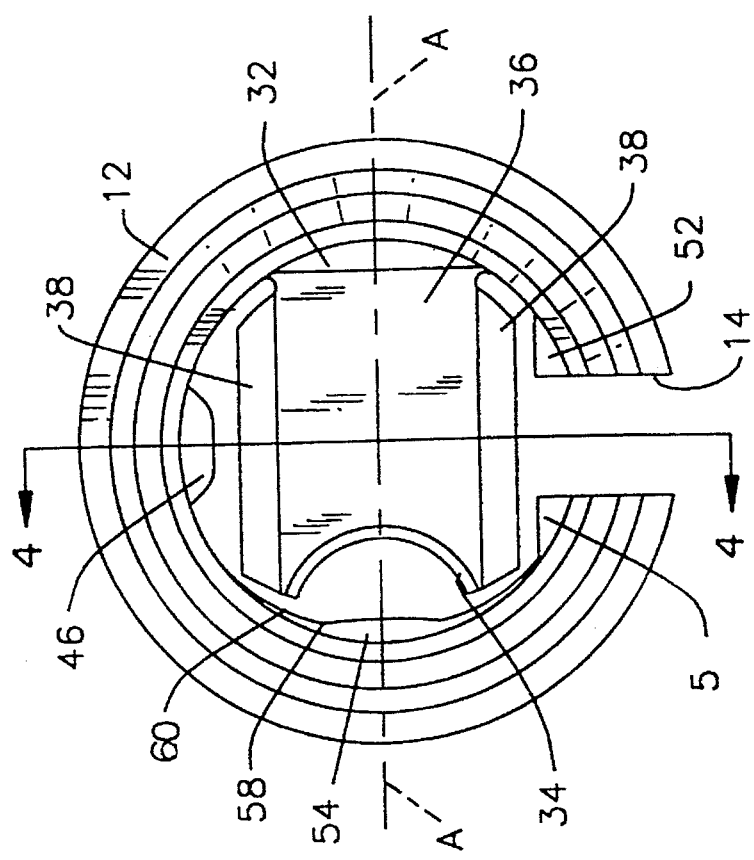
FIG. 3 is an axial view of the connector clamp.

The clamp 10 has a cylindrical body or housing 12. As shown in FIG. 3, the body 12 is provided with a slot 14 extending along its length, to enable the body 12 to be compressed, as detailed below.

The body 12 has generally cylindrical inner and outer surfaces and a uniform radial thickness along most of its length, extending from one end, on the right in FIG. 1, to a second end, shown on the left in FIG. 1. At the second end, there is a first conical surface 16 extending back from an end lip 18. This conical surface 16 continues into a second conical surface 20, having a small angle relative to the first conical surface 16.

The second conical surface 20 continues into a short cylindrical surface 22. Adjacent this surface 22, there is an annular groove 24, which is bounded on its other side by an annular rib 26. The annular rib 26 has a tapered surface 28 on its side away from the groove 24, but any suitable profile can be provided.

Internally, a clamping element 30 is provided extending across the interior of the body 12, with the reference 30 designating a normal rest position of the clamping element in FIG. 1. A short neck portion 32 connects the main body portion of the clamping element 30 to the body 12, as shown in FIG. 3; as FIG. 1 shows, the neck portion 32 curves through approximately 45°. The main body portion of the clamping element 30 then bends or curves in the opposite direction, so that a free end portion 34 extends approximately perpendicularly to the axis of the main body 12.

Figure 4:
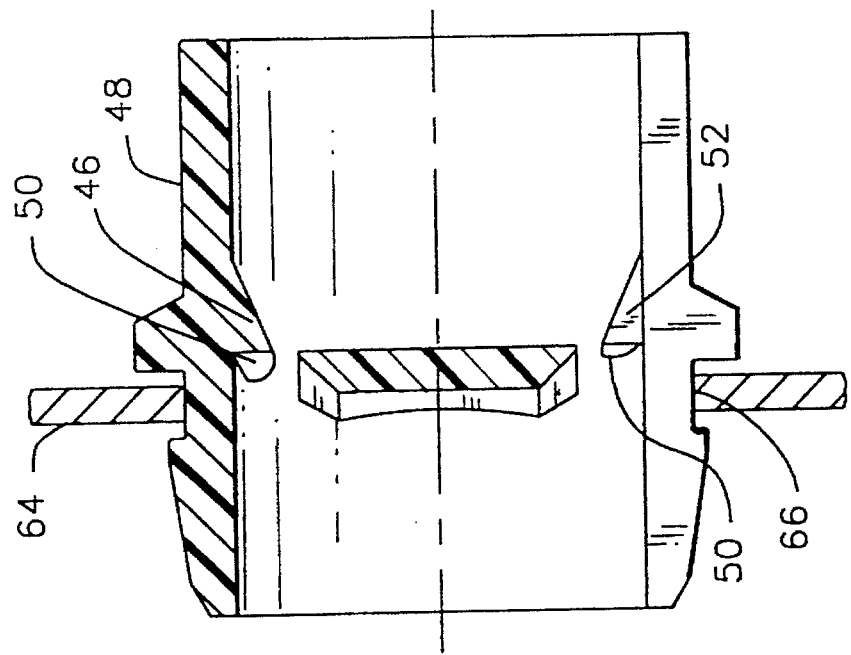
FIG. 4 is a sectional view along line BB of FIG. 3.

The main body portion of the clamping element 30 has a central portion 36 of generally uniform thickness, and two symmetrical side portions 38. The side portions 38 have their ends curved to correspond to the cylindrical curvature of the body 12, and as shown in FIG. 4, are tapered along their length.

The free end portion 34 has an end surface configured as shown in FIG. 2. This end surface is cut back as indicated as 40, to form a tapered lip or engagement flange 42. In section, this has a generally straight end surface; at one side it is bound by continuation of the surface of the main body, while on the other side it has an inclined surface indicated at 44. Viewed axially, the lip 42 is circular, and has its centre located substantially on the inner wall of the housing or body 12.

On the interior of the cylindrical body 12, opposite the slot 14, there is a tapered projection 46, which has an inclined surface 48, and an abutment face 50, generally perpendicular to the axis of the body 12.

Opposite the tapered projection 46 there are two corresponding smaller tapered projections 52, adjacent to the slot 14. Again as shown in FIG. 4, these projections 52 correspond to the projection 46, and provide an abutment face 50.

The clamping lip or flange 42 of the clamping element 30 faces an arcuate projection 53, which as shown in FIG. 1, provides an abutment surface 54, and also has a tapered or inclined surfaced 56. As shown in FIG. 3, this arcuate projection 53 is of varying radial extent. It has a central convex portion 58 of maximum radial extent; on either side of this, there are two side portions 60 which taper.

In use, as shown in FIG. 1, a cable is inserted in the direction of arrow 70 through a first end of the cylindrical body 12. The cable forms no part of the present invention, and hence, the exact cable configuration is immaterial. Currently, common wiring cables comprise an outer, insulating sheath which encloses two conductors, each having their own, individual, insulating sheaths. In between or adjacent these there is often an uninsulated ground wire, enclosed by the outer sheath. The overall cable, in section, has a generally FIG. 8 cross-section. As such, it would be usually inserted with the longer dimension of the FIG. 8 cross-section perpendicular to the plane of FIG. 1, i.e. so as to deflect the clamping element inserted by the minimum amount.

In FIG. 1, a cable of relatively small cross-section is indicated at 72. As shown, such a cable deflects the clamping element 30 to a position 30A, towards a second end of the cylindrical body 12. In this position, the angle of the clamping element and the geometry is such as to cause the locking lip 42 to dig firmly into the outer sheath of the cable, if any withdrawal force is applied to the cable 72 in the direction of arrow 74, i.e. towards the first end of the body 12. Note that the clamping element 30 tends to rotate counter clockwise, as viewed in FIG. 1, if force is applied in the direction of arrow 74, which in turn presses the cable 72 down against the arcuate projection 53. Thus, tension in the direction arrow 74 causes both the projection 53 and the locking lip 42 to engage the cable sheath more firmly to retain the cable.

For a larger cable indicated at 76, the clamping element 30 will be deflected to a position 30B. Here, the geometry is less favourable for generating large clamping forces. Rather, displacement of the larger cable 76 in the direction arrow 74 would apply mainly an axial load on the clamping element 30, and there would be a smaller force tending to press the locking lip 42 into the sheath of the cable 76. Nonetheless, the configuration of the locking lip 42, and also the provision of the additional projection 53 serve to securely clamp the cable 76 and prevent its withdrawal.

Figure 5:
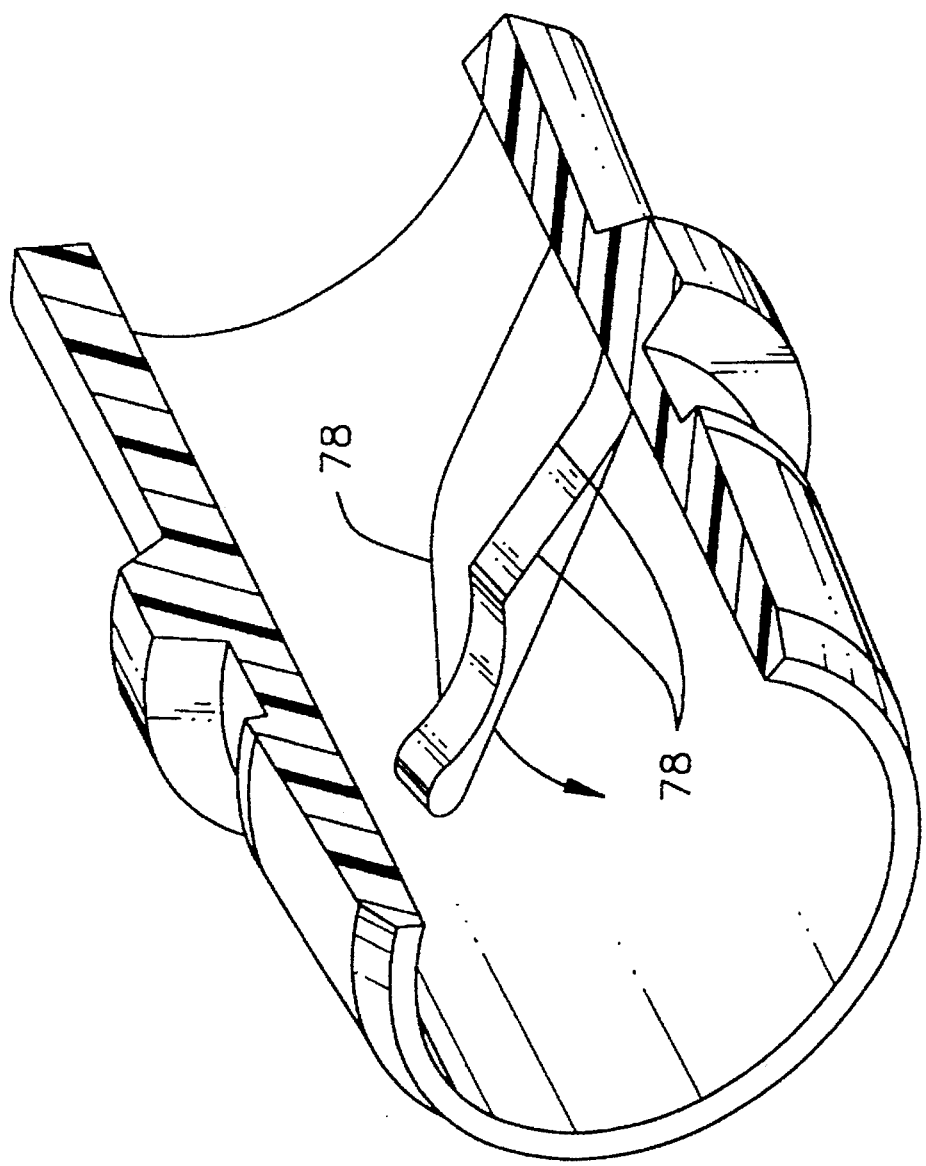
FIG. 5 is a perspective view, partially cut away, of the connector clamp of the present invention.

Additionally, as indicated at 78 in FIGS. 1 and 5, for cables of sufficient size, the clamping element 30, at a position 78 will abut the inner surface of the cylindrical body 12. This shortens the effective length and moment arm of the clamping element 30, so that a greater force would be applied at the sealing lip 42, and it will provide greater resistance to further deflection and bending. The location 78 is located at approximately a third of the length of the clamping element 30 from its junction with the cylindrical body 12.

Figure 6B:
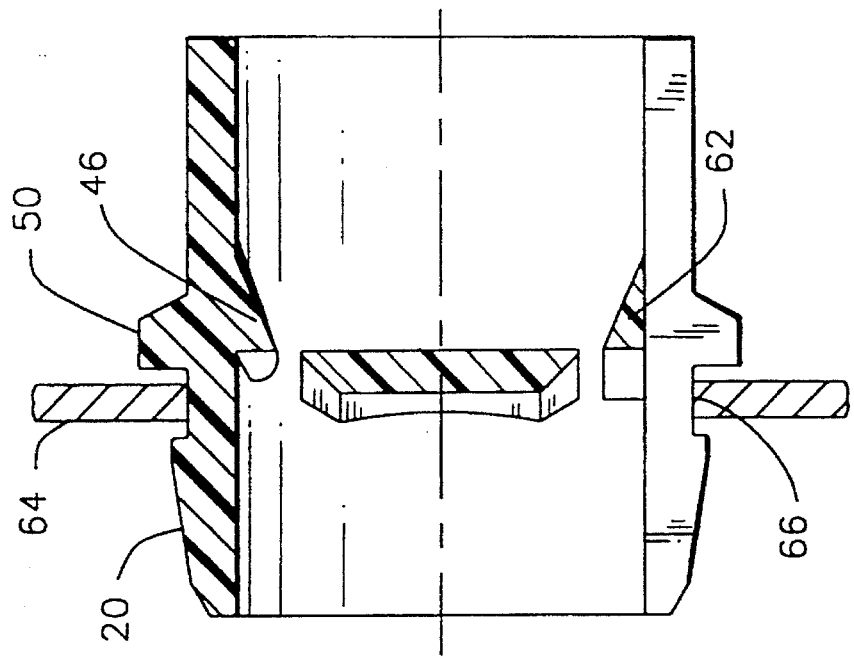
FIGS. 6a and 6b are views, similar to FIGS. 3 and 4, of a variant embodiment of the invention.
Figure 6A:
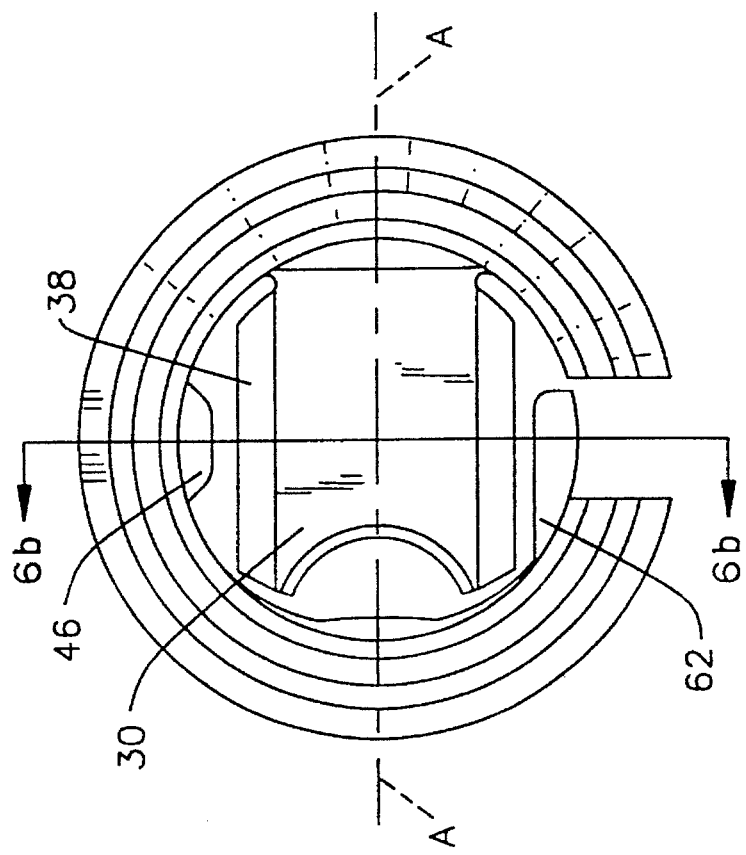

Finally, with reference to FIG. 6, there is shown a variant of the cable connector clamp 10. This generally corresponds to that shown in FIGS. 1–5, with the exception of the projections 52. Here, a single projection 62 is provided. This projection 62 can be generally similar, in section, to the projections 46, 52; i.e. it can provide a generally perpendicular abutment face and a tapered face, as shown in FIG. 6b. Projection 62 has a generally curved radially outer surface and is dimensioned so that it will bridge the slot 14, when clamp 10 is inserted in a knockout hole in an enclosure.

In use, the connector cable clamp 10 will first be inserted in a knockout hole of an enclosure. The wall of the enclosure shown at 64 in FIG. 4 with the hole or knockout indicated at 66. The conical surfaces 16, 20 enable the clamp 10 to simply be inserted from one side and pushed into the hole, until the closure wall 62 engages the annular groove 24. The slot 14 enables the clamp 10 to be readily compressed in the radial direction. After full insertion, the clamp 10 is simply released, so that it expands to adopt the configuration shown in FIG. 4. The sides of the annular groove 24 then securely retain the clamp 10 in position, in known manner. Usually, it will be inserted from the outside of an enclosure. And then, a cable can, similarly, be inserted from outside the enclosure, for the purposes of resisting any loads tending to pull the cable away from the enclosure. This then eliminates any mechanical loads being applied to individual connections within the enclosure itself, with mechanical loads being taken solely by the housing and the cable clamp 10.

We claim:

1. A cable connector clamp comprising:

a housing having first and second ends and an inner wall defining a passage between the first and second ends, for an insulated electrical cable;

means on the housing for engaging an opening in an enclosure wall;

a clamping element extending from one side of the inner wall across the passage and inclined towards the second end, the clamping element including a free end portion and being resiliently deflectable to permit insertion of the electrical cable through the passage from the first end, the free end portion being resiliently biased against the cable to secure the cable from withdrawal through the first end, wherein the clamping element includes a neck portion attached to the inner wall of the housing, the neck portion curving towards the second end of the housing to present a convex surface to the first end of the housing, and the clamping element including a body portion extending from the neck portion to the free end portion, the body portion being curved in a direction opposite to the neck portion to present a concave surface towards the first end of the housing, the free end portion of the clamping element being substantially perpendicular to a longitudinal axis of the housing in a rest position, thereby permitting a range of cable sizes to be positively clamped therein.

2. A connector clamp as claimed in claim 1, wherein the housing is generally cylindrical and the inner wall is cylindrical the clamping element being spaced from the inner wall except for the neck portion.

3. A connector clamp as claimed in claim 2, which includes side projections on either side of the clamping element, which side projections are integrally formed with the housing, and each of which provides an inclined surface extending from the first end, and an abutment face, generally perpendicular to the axis of the housing and facing the second end thereof, to assist in clamping the cable, with the clamping element having side portions spaced from the side projections.

4. A connector clamp as claimed in claim 3, which is integrally formed from a resilient plastic material, and includes an elongate slot in the housing and parallel to the axis thereof, to permit the housing to be compressed for insertion in the enclosure wall, wherein the slot is located on one side of the clamping element, and the side projections are provided on the inner wall and on either side of the slot.

5. A connector clamp as claimed in claim 3, wherein the housing includes an elongate slot extending axially thereof, permitting the housing to be compressed for insertion in the opening in the enclosure wall, wherein the slot is located on one side of the clamping element, and one of the side projections extends across the slot, so as to at least partially close the slot, when the connector clamp is inserted in the opening in the enclosure wall.

6. A connector clamp as claimed in claim 5, wherein the clamping element includes substantially parallel, straight side edges.

7. A connector clamp as claimed in claim 5, wherein the clamping element includes a central portion, side edges and side portions, which extend between the central portion and the side edges and taper in thickness towards the side edges, the side edges being generally straight and parallel.

8. A connector clamp as claimed in claim 1, wherein the clamping element is configured so that, when deflected by a large electrical cable, the main portion of the clamping element abuts the inner wall of the housing, substantially axially behind the neck portion, to support the clamping element.

9. A connector clamp as claimed in claim 1, wherein the free end portion includes a clamping lip which is generally concave, and tapers in thickness towards an end surface thereof.

10. A connector clamp as claimed in claim 1, wherein the free end portion includes a clamping lip which is generally concave and circular and tapers in thickness towards an end surface thereof.

11. A connector clamp as claimed in claim 2, wherein the housing includes an additional projection located on another side of the inner wall, generally opposite said one side, and facing the free end portion of the clamping element, the additional projection including an inclined face extending from the first end, and an abutment face generally perpendicular to the axis of the housing and facing the second end.

12. A connecter clamp as claimed in claim 11, wherein the free end portion includes a clamping lip which has a curved, concave profile.

13. A connector clamp as claimed in claim 12, wherein the additional projection has a generally convex central portion, and side portions that taper to the inner wall of the housing.

14. A connector clamp as claimed in claim 12 or 13, which includes side projections on either side of the clamping element, with each of said side projections being spaced from the clamping element and including an inclined face extending from the first end and an abutment face facing the second end and generally perpendicular to the axis of the housing.

15. A connector clamp as claimed in claim 12 or 13, which includes side projections on either side of the clamping element, with each of said side projections being spaced from the clamping element and including an inclined face extending from the first end, and an abutment face facing the second end and generally perpendicular to the axis of the housing, and wherein the clamping element includes substantially parallel, straight edges, spaced from the side projections.

16. A connector clamp as claimed in claim 12 or 13, which includes side projections on either side of the clamping element, with each of said side projections being spaced from the clamping element and including an inclined face extending from the first end and an abutment face facing the second end and generally perpendicular to the axis of the housing, and wherein the connector clamp is integrally formed from a resilient plastic material and includes a slot in the housing extending parallel to the axis thereof, to permit compression of the housing for insertion into the opening of the enclosure wall, with the slot located to one side of the clamping element.

17. A connector clamp as claimed in claim 12 or 13, wherein the means on the housing for engaging the opening in the enclosure wall comprises an annular groove adapted to engage the enclosure wall around the opening therein, the annular groove being defined by an annular rib on the side facing the first end, and by a conical portion extending from the second end and having at least one conical surface facilitating insertion through the opening and compressing the housing during insertion.

18. A cable connector clamp comprising:

a housing having first and second ends and an inner wall defining a passage between the first and second ends for an insulated electrical cable;

means on the housing for engaging an opening in an enclosure wall;

a clamping element extending from one side of the inner wall across the passage and inclined towards the second end, the clamping element including a free end portion and being resiliently deflectable to permit insertion of the electrical cable through the passage from the first end, the free end portion being resiliently biased against the cable to secure the cable from withdrawal through the first end;

at least one projection on the inner wall of the housing adjacent the free end portion of the clamping element and spaced therefrom, to assist in clamping the cable, and side projections on either side of the clamping element, the clamping element being spaced from the side projections, each of said side projections including an inclined face extending from the first end and an abutment face substantially perpendicular to a longitudinal axis of the housing and facing the second end thereof to assist in clamping the cable and to substantially enclose the passage in the housing; wherein the housing is generally cylindrical, and the clamping element comprises a neck portion extending from the inner wall of the housing and a main portion which is spaced from the inner wall of the housing the housing further including an elongate slot extending parallel to the axis thereof, to one side of the clamping element, with the connector clamp being integrally molded from a resilient plastic material, the housing further including one of said side projections opposite from the slot and adjacent the slot, one of a pair of said side projections on either side of the slot, and a single one of said side projections secured adjacent one side of the slot and extending across the slot, for at least partially closing the slot when the connector clamp is inserted in the opening of the enclosure wall.

19. A connector clamp as claimed in claim 18, wherein the clamping element includes substantially parallel, straight side edges spaced from the side projections.

20. A connector clamp as claimed in claim 19, wherein the clamping element is configured so that, when deflected by a large electrical cable, the main portion of the clamping element abuts the inner wall of the housing, substantially axially behind a connection between the clamping element and the housing to support the clamping element.

21. A cable connector clamping comprising:

a housing having first and second ends and an inner wall defining a passage between the first and second ends, for an insulated electrical cable;

means on the housing for engaging an opening in an enclosure wall;

a clamping element extending from one side of the inner wall across the passage and inclined towards the second end, the clamping element including a free end portion and being resiliently deflectable to permit insertion of the electrical cable through the passage from the first end, the free end portion being resiliently biased against the cable to secure the cable from withdrawal through the first end, the clamping element including a central portion, side edges and side portions, which extend between the central portion and the side edges and taper in thickness towards the side edges, the side edges being generally straight and parallel.

22. A cable connector clamp for insulated electrical wire cable, comprising:

a housing having first and second ends and an inner wall defining a passage between the first and second ends for receiving an insulated electrical wire cable; and a clamping element extending from one side of the inner wall across the passage and inclined towards the second end, the clamping element including a free end portion and being resiliently deflectable to permit insertion of the electrical cable through the passage from the first end, the free end portion including a gripping means for grippingly engaging said cable between the inner wall and the clamping element when the cable is urged in a direction opposite to the direction of insertion, wherein the clamping element is curved to present a concave surface towards the first end of the housing and the free end portion is substantially perpendicular to a longitudinal axis of the housing in a rest position thereby permitting a range of cable sizes to be positively clamped therein.

23. A cable connector clamp as defined in claim 22, wherein the housing is generally cylindrical and the inner wall is cylindrical the clamping dement including a body portion and being attached to the housing by a lower portion, and otherwise being spaced from the inner wall, the clamping element being configured so that, when deflected by a large cable, the body portion of the clamping element abuts the inner wall of the housing, substantially axially behind the lower portion to support the clamping element thereby shortening a movement arm of the clamping element so that a greater force is applied to the cable by the gripping means and provides greater resistance to further deflecting and bending of the clamping element.

* * * * *